United States Patent [19]

Fuji et al.

[11] Patent Number: 5,134,607
[45] Date of Patent: Jul. 28, 1992

[54] OPTICAL MEMORY SYSTEM FOR GENERATING A TIMING CONTROL SIGNAL FOR DETECTING A RECORDED REGION THROUGH A PLAYBACK SIGNAL

[75] Inventors: Hiroshi Fuji, Tenri; Shigemi Maeda, Yamatokoriyama; Noriaki Sakamoto, Kyoto; Shigeo Terashima; Takeshi Yamaguchi, both of Tenri; Kentaro Tsuji; Kunio Kojima, both of Nara, all of Japan

[73] Assignee: Sharp Kabushiki Kaisha, Osaka, Japan

[21] Appl. No.: 564,799

[22] Filed: Aug. 9, 1990

Related U.S. Application Data

[62] Division of Ser. No. 440,261, Nov. 22, 1989, Pat. No. 4,999,824, which is a division of Ser. No. 12,087, Feb. 6, 1987, Pat. No. 4,924,447.

[30] Foreign Application Priority Data

| Feb. 7, 1986 | [JP] | Japan | 61-26636 |
| Feb. 28, 1986 | [JP] | Japan | 61-45761 |
| Mar. 28, 1986 | [JP] | Japan | 61-73298 |

[51] Int. Cl.$^5$ ............................................. G11B 7/00
[52] U.S. Cl. ...................................... 369/124; 369/121; 369/32; 369/13
[58] Field of Search ................. 369/124, 121, 32, 47, 369/48, 54, 58, 59; 360/46.67

[56] References Cited

U.S. PATENT DOCUMENTS

| 4,385,328 | 5/1983 | Tanaka | 360/46 |
| 4,418,406 | 11/1983 | Ogawa | 369/124 |
| 4,646,281 | 2/1987 | Verboom | 369/124 |

Primary Examiner—Stuart S. Levy
Assistant Examiner—Hoa Nguyen

[57] ABSTRACT

An optical memory device for recording, reproducing, or erasing information applies an optical beam such as a laser beam onto a recording medium. The optical memory device includes a recorded region detecting circuit for detecting information recorded region formed in the recording medium. In the optical memory device, a timing control for recording, reproducing, or erasing is performed with the use of a result obtained through detection of a synchronizing signal, such as a sector mark, indicative of a starting point of an information block and another result obtained through detection in the recorded region detecting circuit. The recorded region detecting circuit includes either at least one peak hold circuit for detecting a peak level of the playback signal or a low pass filter for smoothing the playback signal, and a comparator for comparing an output obtained through the peak hold circuit or through the low pass filter with a reference voltage.

6 Claims, 12 Drawing Sheets

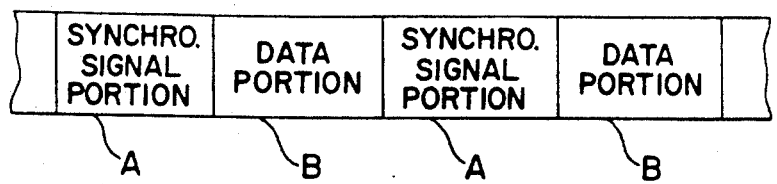
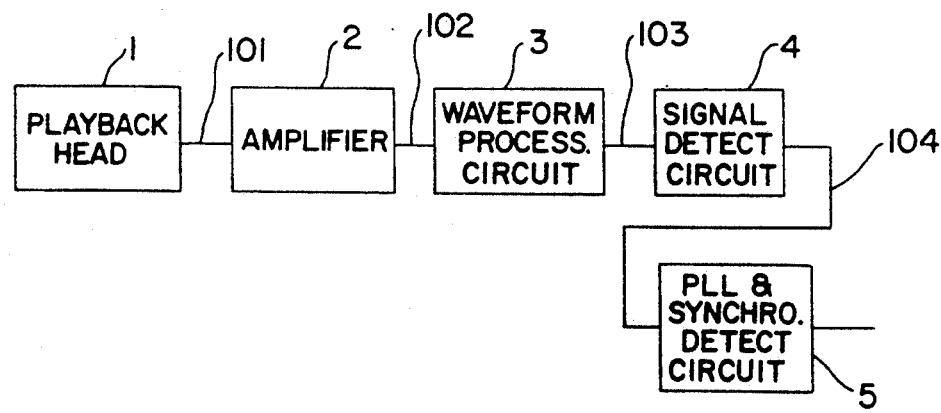
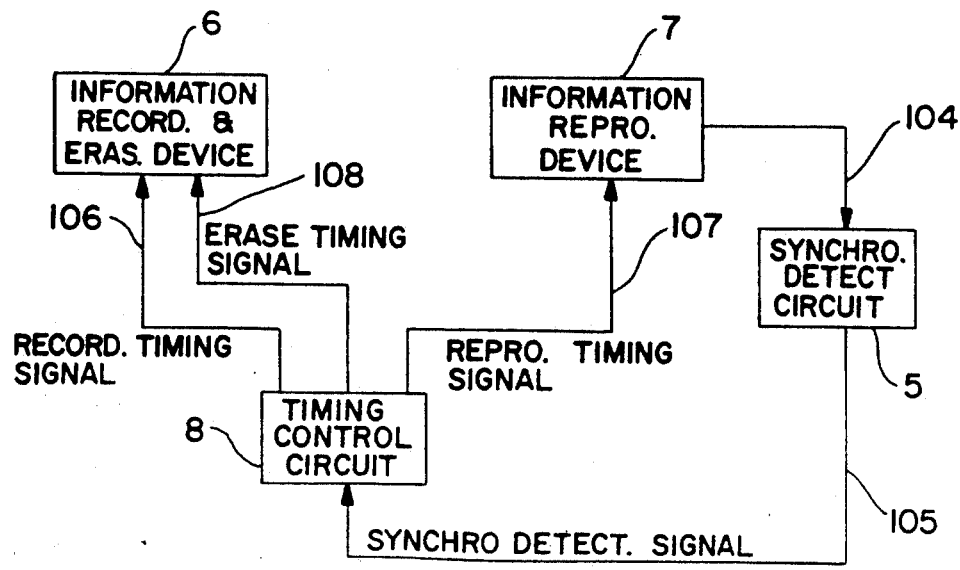

DISCHARGE FROM PEAK HOLD CIRCUIT

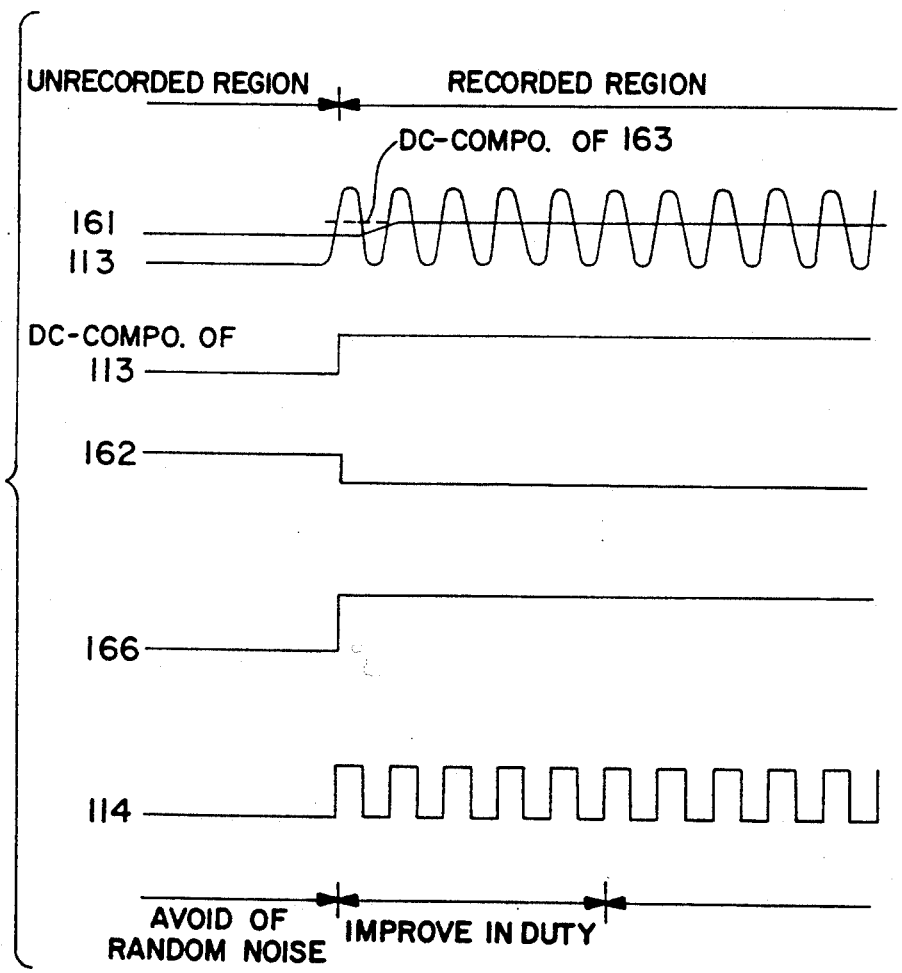

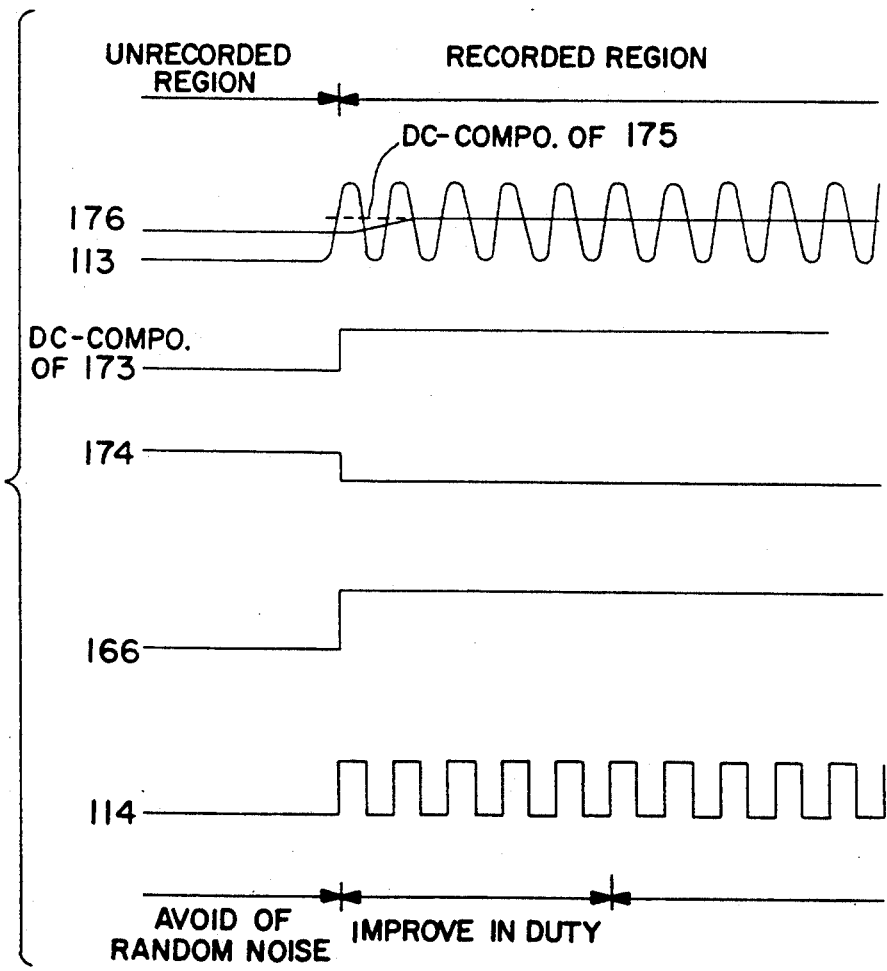

OPTICAL MEMORY SYSTEM FOR GENERATING A TIMING CONTROL SIGNAL FOR DETECTING A RECORDED REGION THROUGH A PLAYBACK SIGNAL

This application is a divisional of copending application Ser. No. 07/440,261 filed on Nov. 22, 1989, now U.S. Pat. No. 4,999,824 which is a divisional application of prior application Ser. No. 07/012,087 filed on Feb. 6, 1987, now U.S. Pat. No. 4,924,447.

BACKGROUND OF THE PRESENT INVENTION

The present invention generally relates to a memory device, and more particularly, to an optical memory device for recording, reproducing, or erasing information by applying an optical beam such as a laser beam or the like onto a recording medium.

A magneto-optic disc memory device which is one of optical memory devices, is a device for recording, reproducing, or erasing information by applying a laser beam onto a recording medium of a magnetic film having an axis of easy magnetization in a direction perpendicular to its surface. A method for recording or reproducing the information in the aforementioned magneto-optic disc memory device will be described below with reference to FIGS. 1, 2 and 3.

In case of recording, when the laser beam is initially modulated at strength in accordance with a recording signal after having been converged to a diameter of approximately 1 μm and is applied onto the surface of the temperature of the magnetic film, the magnetic film is locally raised. Since the raised temperature of a portion of the magnetic film reduces the coercive force, when an auxiliary magnetic field is simultaneously applied thereon from outside, the information is recorded on the magnetic film through reversing of a direction to be magnetized.

In case of reproducing, the magnetic film which has been recorded on its surface is applied with a polarized straight light of the laser having a reduced amount of strength than when recording. At this moment, a polarized surface of a reflected light is inclined through a magneto-optic effect of the magnetic film called the Kerr effect. This inclination is detected by a photo-detecting element through the measuring of the strength of light, and, upon detection of this strength by a photo-detecting unit, the information is reproduced.

Generally, in the magneto-optic memory device which is recordable therein, a row of data of reproducing signals is composed of a plurality of synchronizing signal portions A each including an address portion and a sector mark indicative of a starting point of a sector, and a plurality of actual data portions B each having the information thereon, with the synchronizing signal portions A and the actual data portions B being formed in the row of data alternately with each other as shown in FIG. 1. The row of data is reproduced by an information reproducing device as shown in FIG. 2. A signal 101 initially detected by a playback head 1 is amplified through an amplifier 2 so that a reproducing signal 102 may be outputted therefrom. The signal 102 further processed in a waveform processing circuit 3 is fed into a signal detecting circuit 4 in which a digital information signal 104 is detected. The digital information signal 104 is introduced into a PLL (Phase Locked Loop) and a synchronization detecting circuit 5, and thereafter, the PLL generates a clock signal synchronized in phase on the basis of the digital information signal 104 led thereinto, while the synchronization detecting circuit 5 performs a detection of synchronization in the unit of a sector such as a sector mark.

With reference to FIG. 3, a conventional method related to a timing control for recording, reproducing or erasing will be explained below.

The synchronizing signals and the actual data of the aforementioned row of data are reproduced by the information reproducing device 7 having a construction as described above. The synchronization is detected in the synchronization detecting circuit 5 with the use of each synchronizing signal and the synchronization detecting signal 105 is fed into a timing control circuit 8 which sends timing signals 106 and 108 respectively for recording and for erasing to an information recording and/or erasing device 6 and sends a timing signal 107 for reproducing to the information reproducing device 7, on the basis of the synchronization detecting signal 105.

In the conventional method of the timing control, however, since the timing control has been performed only on the basis of the synchronization detecting signal 105, when some error has taken place on the synchronization detecting signal, the timing control cannot be correctly performed, thus resulting in a drawback that the reliability in recording, reproducing or erasing is lost.

SUMMARY OF THE PRESENT INVENTION

Accordingly, the present invention has been developed to substantially eliminate the above described disadvantage inherent in the prior art optical memory device, and has for its essential object to provide an improved optical memory device in which a timing control for recording, reproducing or erasing can be performed at high reliability.

Another important object of the present invention is to provide an optical memory device of the above described type which is stable in functioning and can be readily manufactured at low cost.

In accomplishing these and other objects, according to one preferred embodiment of the present invention, there is provided an optical memory device for recording, reproducing, or erasing information by applying an optical beam, such as a laser beam, onto a recording medium, the optical memory device including a recorded region detecting circuit for detecting an information recorded region formed in the recording medium, wherein a timing control for recording, reproducing, or erasing is performed with the use of one result obtained through detection of a synchronizing signal, such as a sector mark, indicative of a starting point of an information block and another result obtained through detection in the recorded region detecting circuit. The recorded region detecting circuit comprises either at least one peak hold circuit for detecting a peak level of the playback signal or a low pass filter for smoothing the playback signal, and a comparator for comparing an output obtained through the peak hold circuit or through the low pass filter with a reference voltage.

BRIEF DESCRIPTION OF THE DRAWINGS

These and other objects and features of the present invention will become apparent from the following description taken in conjunction with the preferred embodiment thereof with reference to the accompanying drawings, throughout which like parts are designated by like reference numerals, and in which:

FIG. 1 is a schematic diagram explanatory of a construction of a row of data formed in a conventional magneto-optic disc employed in a magneto-optic disc memory device;

FIG. 2 is a block diagram showing a construction of a conventional information reproducing device employed in the magneto-optic disc memory device;

FIG. 3 is a block diagram showing a construction of a conventional timing control device employed in the magneto-optic disc memory device.

FIG. 21 is a schematic diagram showing the waveforms obtained in the signal detecting circuit of FIG. 20;

FIG. 23 is a schematic diagram showing the waveforms obtained in the signal detecting circuit of FIG. 22.

DETAILED DESCRIPTION OF THE PREFERRED EMBODIMENT

An optical memory device will be explained in detail below with reference to a magneto-optic memory device according to one preferred embodiment of the present invention.

Figure 4:
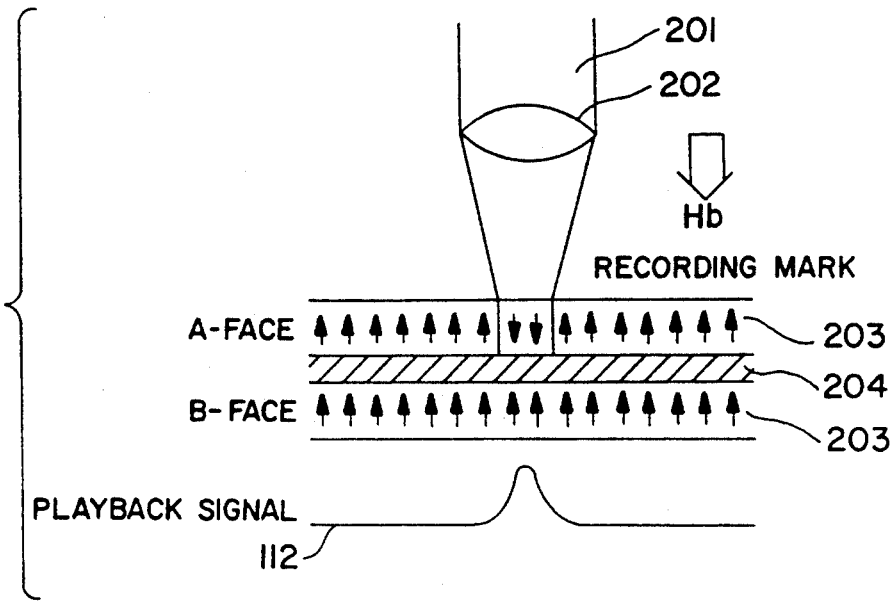
FIGS. 4 and 5 are schematic diagrams for explaining a method of recording on or reproducing from a recording medium employed in a magneto-optic memory device of the present invention.
Figure 5:
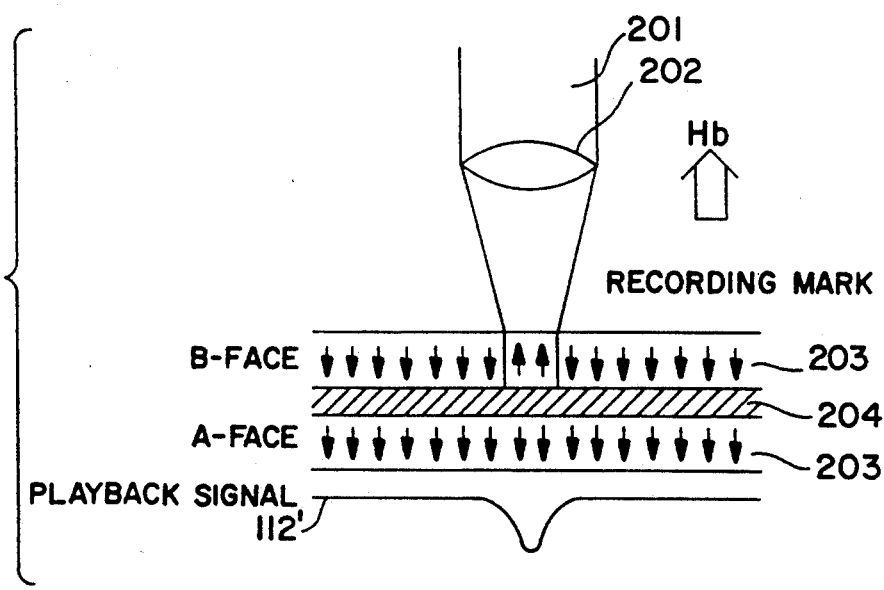

One of magneto-optic discs which is employed as a recording medium for use in the mageto-optic memory device in this embodiment is shown in FIGS. 4 and 5, in which the recording medium is provided with a couple of magnetic films 203 formed on opposite faces the disc. The recording, reproducing or erasing can be executed independently on the opposite faces of the disc with respect to the recording medium of this kind. The couple of magnetic films 203 formed on the opposite faces of the disc are separated by a separating layer 204 and are referred to as an A-face and a B-face in this embodiment. Both the A-face and B-face are generally initialized in advance in the same direction, that is, they are magnetized in the same direction.

It is to be noted that the present invention is also applicable to the recording medium which is provided with a single magnetic film 203 formed on one face (A-face) thereof.

Referring first to FIG. 4, a method for recording on the A-face and for reproducing therefrom will be described below.

When a laser beam 201 converged by an objective lens 202 is applied to the A-face of the magnetic film 203 when recording, the recording is performed such that the direction of magnetization is reversed towards the direction of biasing magnetic field Hb. When reproducing, a playback signal 102 can be obtained so as to correspond to a recording mark shown in FIG. 4.

As shown in FIG. 5, with respect to the B-face, since it has been initialized in advance in the same direction as the A-face in case of recording, the direction of the biasing magnetic field Hb, i.e., the direction of recording is reversed. Accordingly, the recording marks on the A-face and B-face are magnetized reversedly to each other and the playback signal 102' on the B-face is reversed in polarity relative to that 102 on the A-face.

Figure 6:
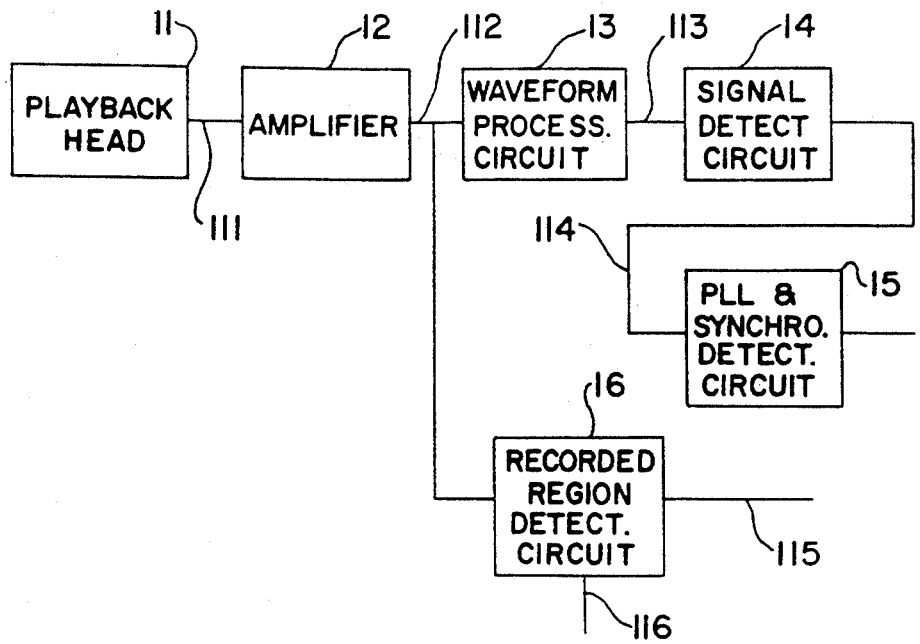
FIG. 6 is a block diagram showing a construction of the information reproducing device according to one preferred embodiment of the present invention.

There is illustrated in FIG. 6, a construction of the magneto-optic memory device according to this embodiment of the present invention. In the magneto-optic memory device of this kind, the playback signal 111 which has been stored in the row of data is detected by a playback head 11 and is subsequently amplified through an amplifier 12. The amplified signal 112 is fed not only into a waveform processing circuit 13, but alos into a recorded region detecting circuit 16. An output 113 from the waveform processing circuit 13 is inputted into a signal detecting circuit 14 so that a digital information signal 114 is detected therein.

On the other hand, in the recorded region detecting circuit 16, a recorded region detecting signal 115 is outputted from the playback signal 112 on the basis of a control signal 116 such as a recorded face identification signal or the like identifying either of the A-face and the B-face. The recorded region is a region formed in each of the synchronizing signal portion and the actual data portion of the recording medium where the information signals are actually recorded.

It is to be noted that the output signal 113 from the waveform processing circuit 13 may be inputted into the recorded region detecting circuit 16 in place of the playback signal 112.

Figure 7:
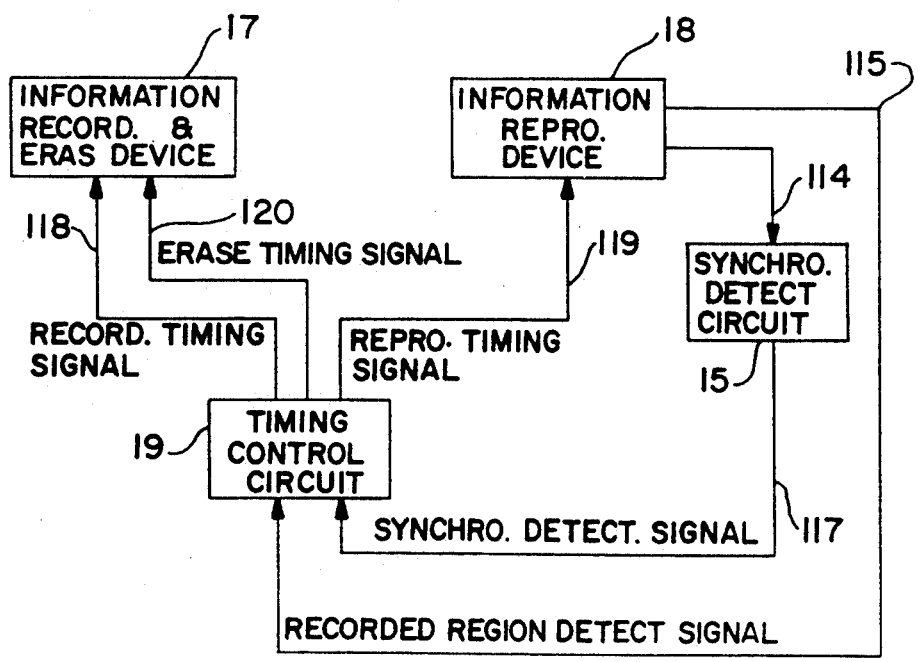
FIG. 7 is a block diagram showing a construction of the timing control device according to one preferred embodiment of the present invention.

FIG. 7 illustrates a construction of a timing control device employed in the magneto-optic memory device for controlling the timing of the recording, reproducing and erasing. For detection of the synchronization in a synchronization detecting circuit 15, the information signal stored in the synchronizing signal portion is utilized selectively from the information signals 114 reproduced in an information reproducing device 18 having the above described construction, and the synchronization detecting signal 117 is fed into a timing control circuit 19. Likewise, the recorded region detecting signals 115 both in the synchronizing signal portion and the actual data portion which have been detected in the information reproducing device 18 are introduced into the timing control circuit 19. The recorded region detecting signal 115 is the timing signal for indicating the region where the information is actually recorded in the recording medium or for indicating the position from which the recorded region starts. The timing control circuit 19 outputs the timing signals 118, 119 and 120 respectively for recording, reproducing, and erasing in accordance with the synchronization detecting signal 117 and the recorded region detecting signal 115.

The magneto-optic memory device of the present invention can be improved in reliability for recording, reproducing, and erasing by adding the timing control caused by the recorded region detecting signal 115 indicative of the actual recorded region or the starting position thereof, as compared with the conventional control only by the synchronization detecting signal 105 as shown in FIG. 3. Moreover, even if some error should take place with respect to the synchronization detecting signal 117, the timing control can be executed by utilizing the recorded region detecting signal 115.

A plurality of preferred embodiments of the recorded region detecting circuit 16 shown in FIG. 6 will be described below.

Figure 8:
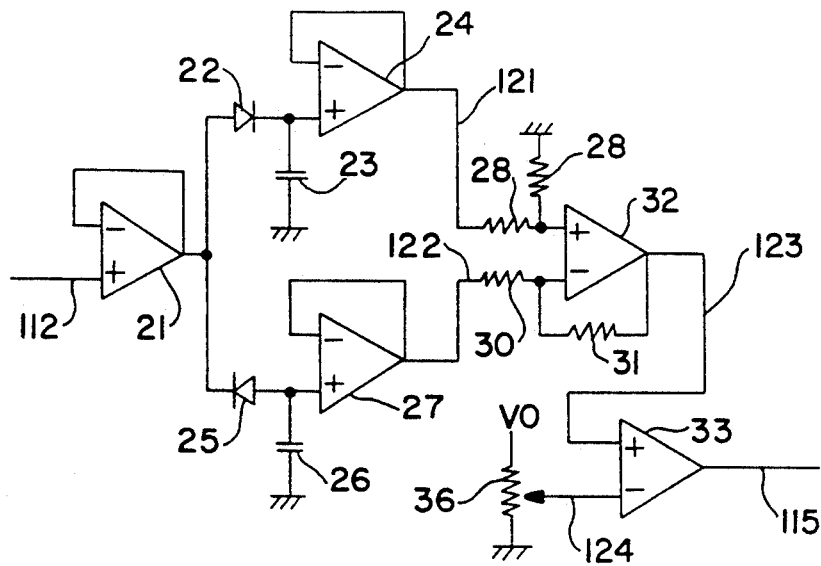
FIG. 8 is a circuit diagram of a recorded region detecting circuit of a first embodiment of the present invention.
Figure 9:
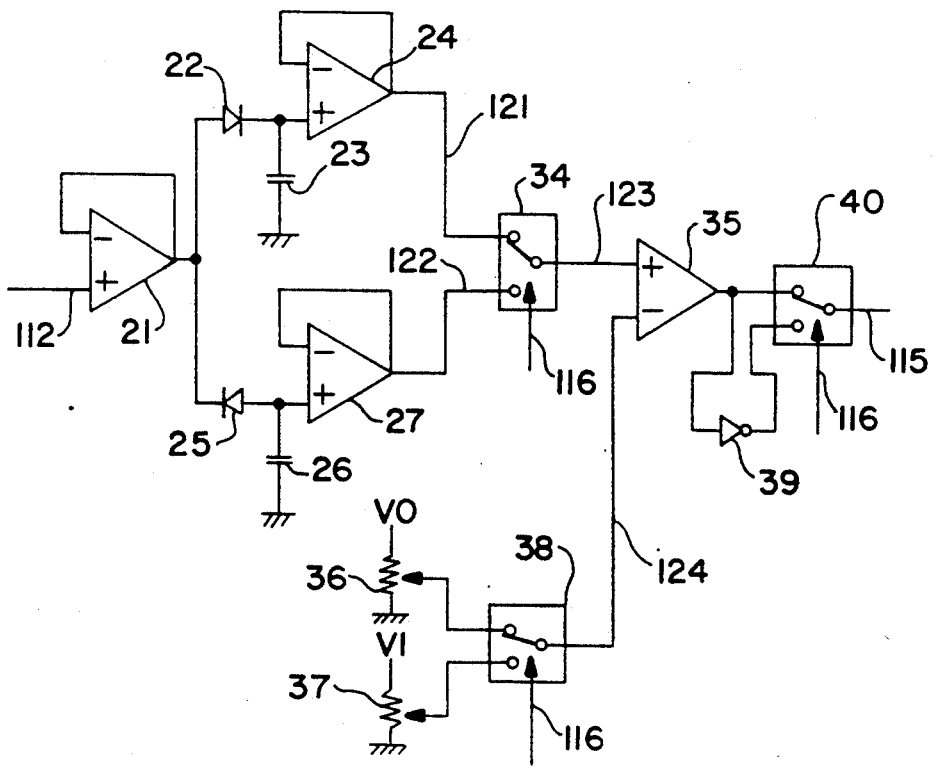
FIG. 9 is a diagram similar to FIG. 8, which particularly shows a modification thereof.
Figure 10:
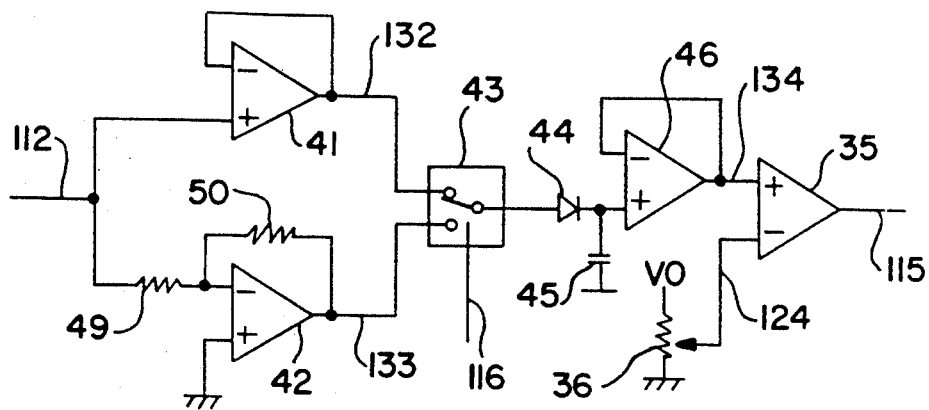
FIG. 10 is a diagram similar to FIG. 8, which particularly shows a further modification thereof.

In FIG. 8, 9, or 10, peak hold circuits are employed in the recorded region detecting circuit 16.

In the recorded region detecting circuit 16 of FIG. 8 which is applicable to the recording medium provided with a single magnetic film 203, the playback signal 112 amplified through the amplifier 12 shown in FIG. 6 is inputted into a noninverting input terminal (i.e., (+) terminal) of an operational amplifier 21 as a buffer. An output from the buffer 21 is not only negatively fed back into an inverting input terminal (i.e., (−) terminal) thereof but also inputted into a couple of peak hold circuits. More specifically, the output from the buffer 21 is applied to a noninverting input terminal of a first operational amplifier 24 as a buffer through a first diode 22 and to a noninverting input terminal of a second operational amplifier 27 as a buffer through a second diode 25, while the output signal through the first diode 22 is directed in a positive direction but on the contrary, the output signal through the second diode 25 is directed in a negative direction. Since a first capacitor 23 is connected between a junction of the first diode 22 and the first buffer 24 and ground, a positive peak hold circuit is constituted by the first diode 22, the first capacitor 23 and the first buffer 24. Likewise, since a second capacitor 26 is connected between a junction of the second diode 25 and the second buffer 27 and ground, a negative peak hold circuit is constituted by the second diode 25, the second capacitor 26 and the second buffer 27. Both outputs from the two peak hold circuits are not only negatively fed back into respective inverting input terminals thereof, but also inputted into a differential circuit including resistors 28, 29, 30 and 31 and an operational amplifier 32. More specifically, the output from the positive peak hold circuit is applied to a noninverting input terminal of the operational amplifier 32 through a first resistor 28, while a second resistor 29 is connected between a junction of the first resistor 28 and the noninverting input terminal of the operational amplifier 32 and ground. On the other hand, the output from the negative peak hold circuit is applied to an inverting input terminal of the operational amplifier 32 through a third resistor 30, while an output signal 123 from the operational amplifier 32 is negatively fed back into the inverting input terminal thereof through a fourth resistor 31. An amplitude detecting signal 123 is obtained as the output signal outputted from the operational amplifier 32. In other words, the differential circuit of this kind is an amplitude detecting circuit for detecting the level of amplitude from the playback signal 112. The amplitude detecting signal 123 is inputted into a noninverting input terminal of a comparator 33 so as to be compared therein with a reference voltage 124 divided from the constant-voltage V0 through a variable resistor 36 and consequently, the recorded region detecting signal 115 is outputted from the comparator 33.

There is shown in FIG. 9, a modification of the recorded region detecting circuit 16 shown in FIG. 8 which is applicable to the recording medium provided with a couple of magnetic films formed on opposite faces thereof, and in which the outputs from both peak hold circuits are introduced into a first switching circuit 34 so that either output is selectively inputted into a noninverting input terminal of a comparator 35 in accordance with a control signal 116, since a movable contact of a switching arm provided in the first switching circuit 34 is selectively connected to either of two stationary contacts each connected to the positive or the negative peak hold circuit, with a stationary contact of the switching arm being connected to the noninverting input terminal of the comparator 35. Either one of voltages divided from constant-voltages V0 and V1 respectively through variable resistors 36 and 37 is selectively applied, as a reference voltage 124, to an inverting input terminal of the comparator 35 in accordance with the control signal 116 through a second switching circuit 38. An output signal from the comparator 35 is inputted into a third switching circuit 40 not only directly but also through an inverter 39 which functions to inverse the output signal from the comparator 35 in polarity. Each of the second and third switching circuit 38 and 40 is substantially the same as the first switching circuit 34.

Accordingly, the recorded region detecting signal 115 can be obtained in a manner that either one result obtained through comparison in the comparator 35 or the other result obtained from this result through inversion thereof of the polarity by the inverter 39 is selected in accordance with the control signal 116 in the third switching circuit 40. It is to be noted that the output signal 123 from one of the peak hold circuits may be introduced into the comparator 35 after having been smoothed through a low pass filter.

Figure 11:
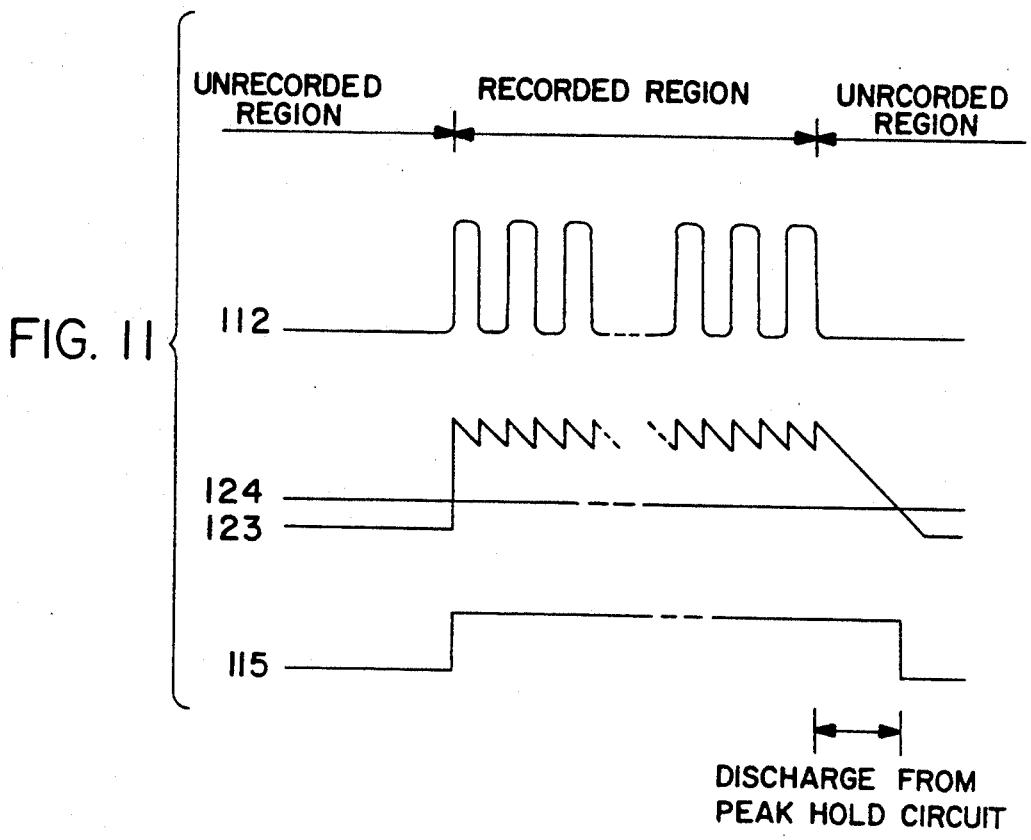
FIGS. 11 and 12 are schematic diagrams showing waveforms obtained in the recorded region detecting circuit of FIGS. 8 or 9.

FIG. 11 illustrates signal waveforms in the foregoing recorded region detecting circuit 16 at the time when the recorded region on the side of the A-face has been detected. As shown in FIG. 11, the playback signal 112 having a large amplitude can be obtained only in the recorded region where the recording has been already performed. The output signal 123 obtained from the playback signal 112 through the amplitude detecting circuit or through the positive peak hold circuit is compared with the reference voltage 124 so that the recorded region detecting signal 115 may be outputted. Although the recorded region detecting signal 115 is high in level by a certain period corresponding to a discharging period of the peak hold circuit in addition to the recorded region, the period of high level is substantially coincident with the recorded region.

Figure 12:
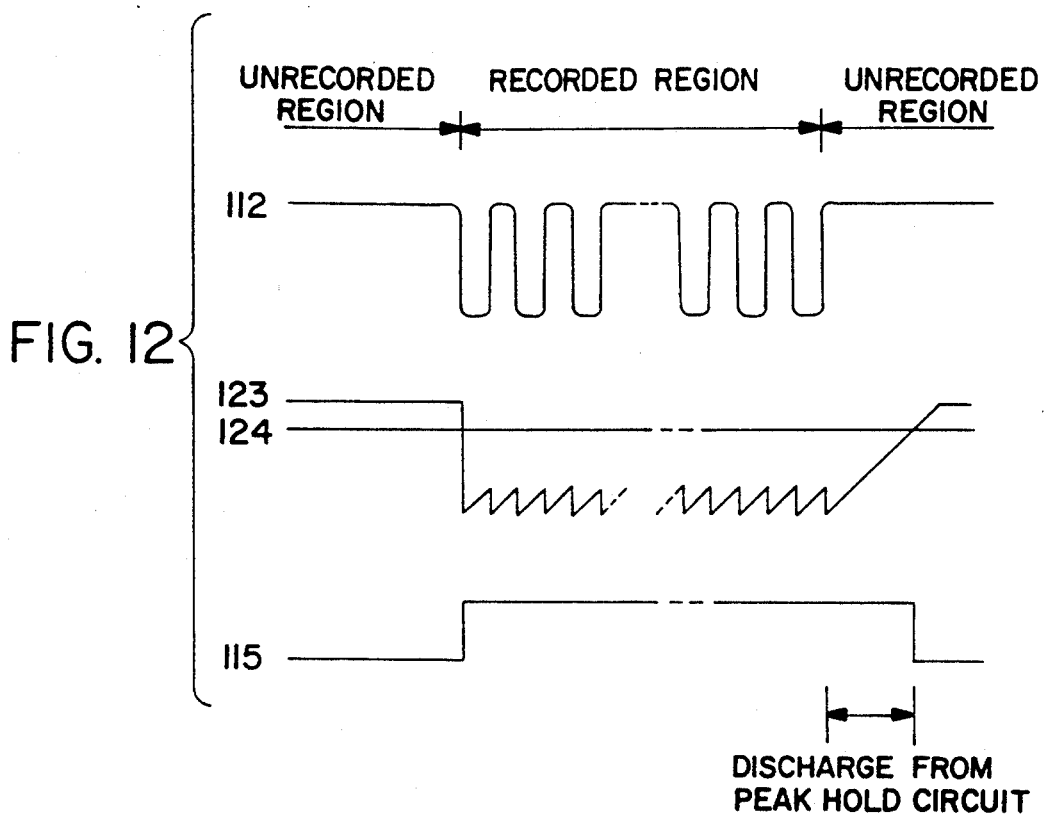

FIG. 12 illustrates the signal waveforms in the recorded region detecting circuit 16 at the time when the recorded region on the side of the B-face has been detected. The playback signal 112 in this case is inverted in polarity relative to that in the aforementioned case on the side of the A-face. Accordingly, on the side of the B-face, the output signal 123 from the negative peak hold circuit is selected in accordance with the control signal 116 in the first switching circuit 28, and with respect to this signal 123, the other reference voltage 124 is selectively inputted into the comparator 29. As a result, the recorded region detecting signal 115 can be obtained through selection of the signal inverted from the comparison result in the comparator 29 in accordance with the control signal 116.

In the above described embodiment shown in FIG. 9, although the recorded region is detected through selection of either the output from the positive peak hold circuit or the output from the negative peak hold circuit, the recorded region can be also detected by selectively inputting either of signals 132 and 133 which are obtained from the playback signal 112 respectively through a buffer 41 and an inverting amplifier 42 into the peak hold circuit, as shown in FIG. 10, with one of the signals 132 and 133 being inversely polarized with respect to the other. More specifically, the playback signal 112 is applied not only to a noninverting input terminal of the buffer 41 but also to an inverting input terminal of the inverting buffer 42 through a resistor 49. An output from the buffer 41 is negatively fed back into an inverting input terminal thereof and an output from the inverting buffer 42 is also negatively fed back into the inverting input terminal thereof through another resistor 50. Furthermore, both of the outputs from the buffers 41 and 42 are fed into a switching circuit 43 which is the same construction as the switching circuit shown in FIG. 9, and thereafter, a signal selectively outputted from the switching circuit 43 is introduced into the noninverting input terminal of the comparator 35 through a peak hold circuit including a diode 44, a capacitor 45 and an operational amplifier 46 as a buffer, with the peak hold circuit in this circuit being the same construction as the positive peak hold circuit shown in FIG. 8 or 9. The voltage divided from the constant-voltage V0 through the variable resistor 36 is also utilized as the reference voltage, as in the above described recorded region detecting circuit shown in FIG. 8. As a result, the recorded region detecting signal 115 is outputted from the comparator 35.

Figure 13:
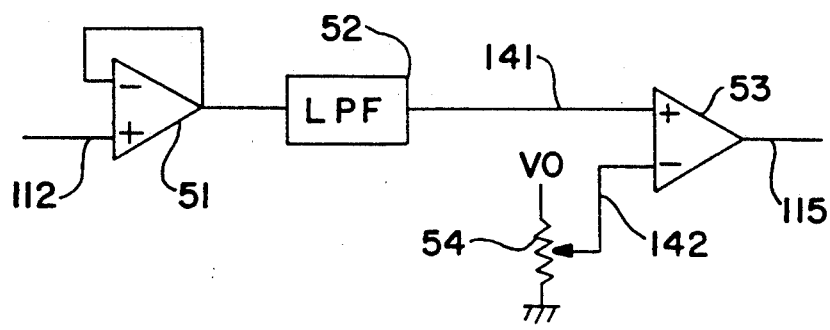
FIG. 13 is a circuit diagram of a recorded region detecting circuit of a second embodiment of the present invention.
Figure 14:
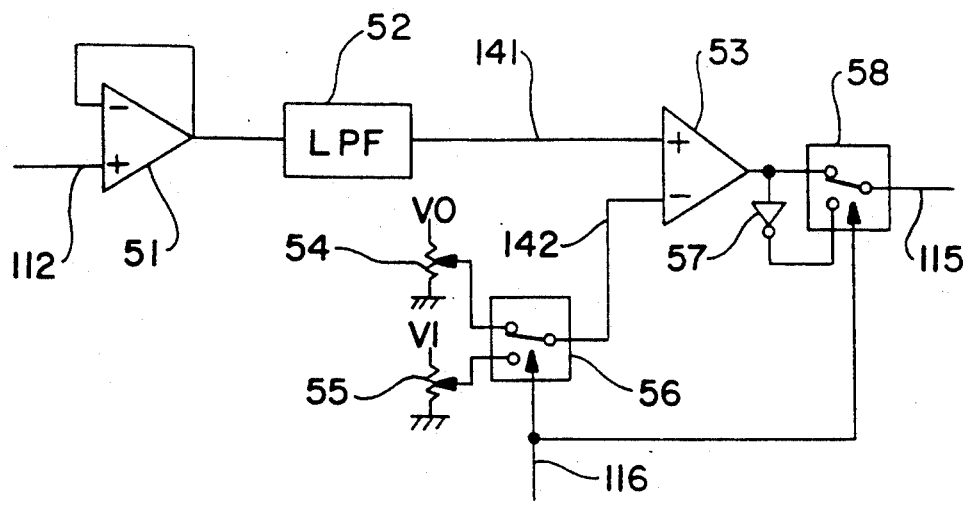
FIG. 14 is a diagram similar to FIG. 13, which particularly shows a modification thereof.
Figure 15:
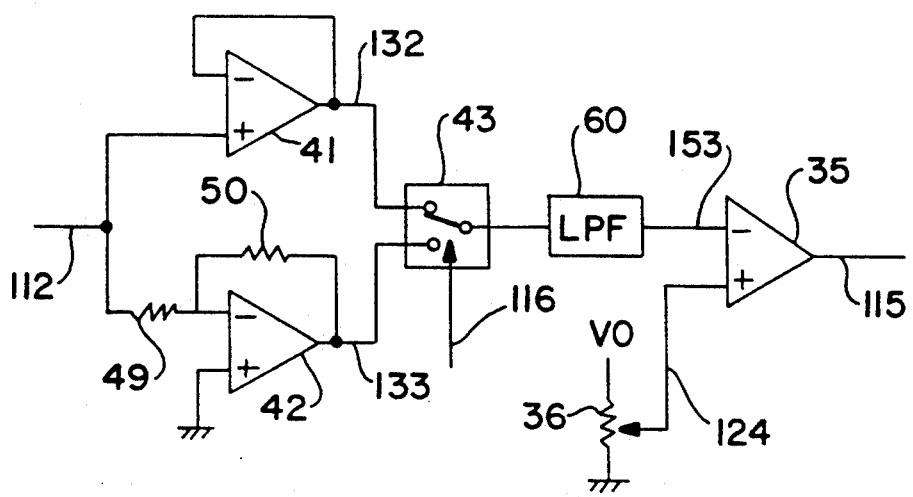
FIG. 15 is a diagram similar to FIG. 13, which particularly shows a further modification thereof.

FIGS. 13, 14 and 15 each illustrate the recorded region detecting circuit 16 employing therein a low pass filter.

In the recorded region detecting circuit shown in FIG. 13 which is applicable to the recording medium provided with a single magnetic film 203, the playback signal 112 is applied to a noninverting input terminal of a buffer 51 and an output signal from the buffer 51 is not only negatively fed back into an inverting input terminal thereof but also inputted into a noninverting input terminal of a comparator 53 through a low pass filter 52 so as to be smoothed therein. A signal 141 outputted from the low pass filter 52 is compared in the comparator 53 with a reference voltage 142 divided from the constant-voltage V0 through a variable resistor 54 so that the recorded region detecting signal 115 is outputted from the comparator 53.

There is shown in FIG. 14, a modification of the recorded region detecting circuit 16 shown in FIG. 13 which is applicable to the recording medium provided with a couple of the metalic films 203 formed on opposite faces thereof, and in which the signal 141 outputted from the low pass filter 52 is also applied to the noninverting input terminal of the comparator 53 as in the circuit shown in FIG. 13. The signal 141 is compared in the comparator 53 with the reference voltage 142 so that the recorded region detecting signal 115 may be outputted through a switching circuit 58 or through an inverter 57 and the switching circuit 58 in accordance with the control signal 116. The reference voltage 142 outputted from a switching circuit 56 is either one of the voltages divided from the constant-voltages V0 and V1 respectively through variable resistors 54 and 55, as in the recorded region detecting circuit shown in FIG. 9. Both of the switching circuits 56 and 58 are also the same construction as those shown in FIG. 8.

Figure 16:
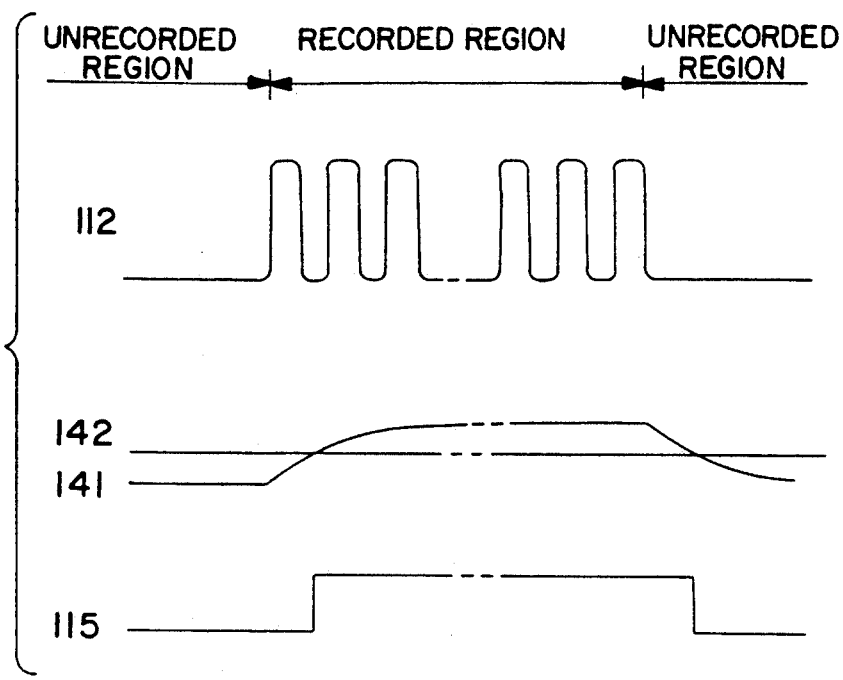
FIGS. 16 and 17 are schematic diagrams showing waveforms obtained in the recorded region detecting circuit of FIGS. 13 or 14.

FIG. 16 shows the signal waveforms at the time when the recorded region on the side of the A-face has been detected. The signal 141 obtained from the playback signal 112 through smoothing in the low pass filter 52 is compared with the reference voltage 142 so that the recorded region detecting signal 115 may be obtained. Although the recorded region detecting signal 115 is delayed by a certain amount corresponding to the transient response of the low pass filter 52 with respect to the recorded region, it is substantially coincident with the recorded region.

Figure 17:
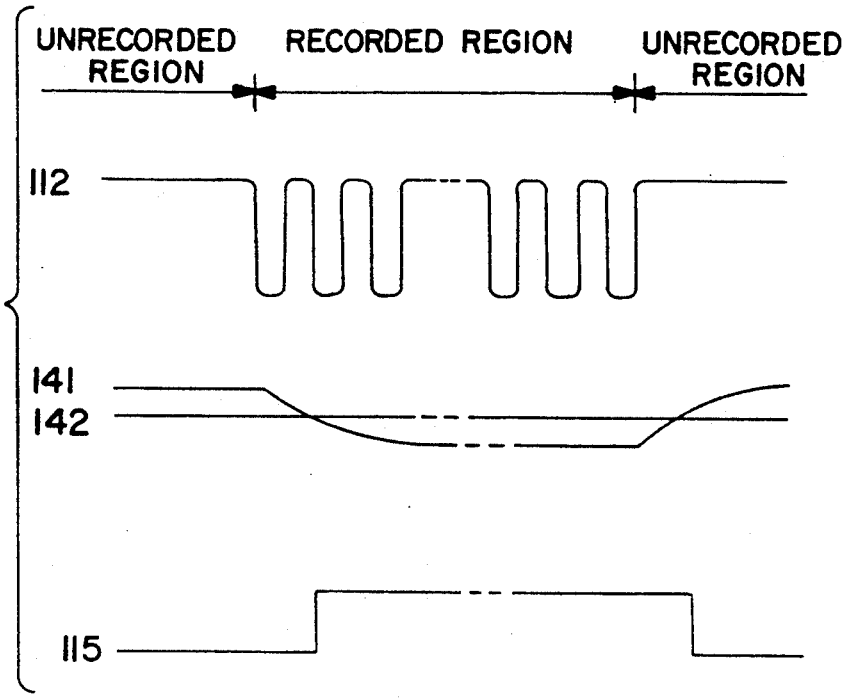

On the other hand, FIG. 17 shows the signal waveforms at the time when the recorded region on the side of the B-face has been detected. The playback signal 112 stored in the B-face is inverted in polarity relative to that in the A-face. Accordingly, the reference voltage different in level from that for the A-face is inevitably utilized to be compared with the output signal 141 from the low pass filter 52. Thereafter, the recorded region detecting signal 115 can be obtained through selection of the signal inverted through the inverter 57 from the comparison result in the comparator 53.

Although the level of the reference voltage 142 is switched in the circuit shown in FIG. 14, the recorded region detecting signal 115 can be also obtained, as shown in FIG. 15, in a manner that either the output 132 from the buffer 41 or the output 133 from the inverting amplifier 42 is selected in accordance with the control signal 116, with the output 133 being obtained from the playback signal 112 by being inverted in polarity with respect to the signal 132. The recorded region detecting circuit shown in FIG. 15 can be obtained by replacing the peak hold circuit between the switching circuit 43 and the comparator 35 in the circuit shown in FIG. 10 with a low pass filter 60.

It is to be noted here that although the waveforms through DC-amplifiers are shown in FIG. 11, 12, 16 or 17, the position from which the recorded region starts can be detected by the transient response through AC-coupling, when AC-amplifiers are employed in the recorded region detecting circuit.

As clearly shown in the above described embodiments, since the recorded region is detected in the magneto-optic recording medium and the timing control for recording, reproducing, or erasing is performed in accordance with the detected signal and the synchronous information in the row of data, the control with high reliability can be executed by the recorded region detecting signal even when some error has taken place in detecting the synchronization.

In the next place, with reference to FIGS. 18 through 23, the signal detecting circuit 14 shown in FIG. 6 will be explained below.

Figure 18:
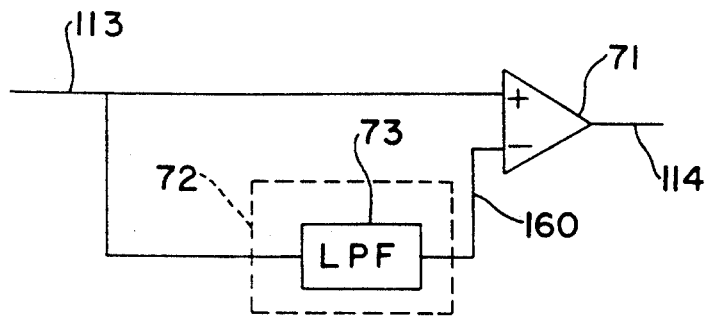
FIG. 18 is a circuit diagram of a signal detecting circuit employed in the present invention.

FIG. 18 shows a first example of the signal detecting circuit 14 in which the playback signal 113 is inputted into a noninverting input terminal of a comparator 71 and into an inverting input terminal thereof through a reference voltage generating circuit 72 which is encircled by a dotted line. A low pass filter 73 is employed as the reference voltage generating circuit 72 in this example. The reference voltage 160 obtained as an output from the reference voltage generating circuit 72 is introduced into the inverting input terminal of the comparator 71 so that a digital information signal 114 can be obtained as an output from the comparator 71.

Figure 19:
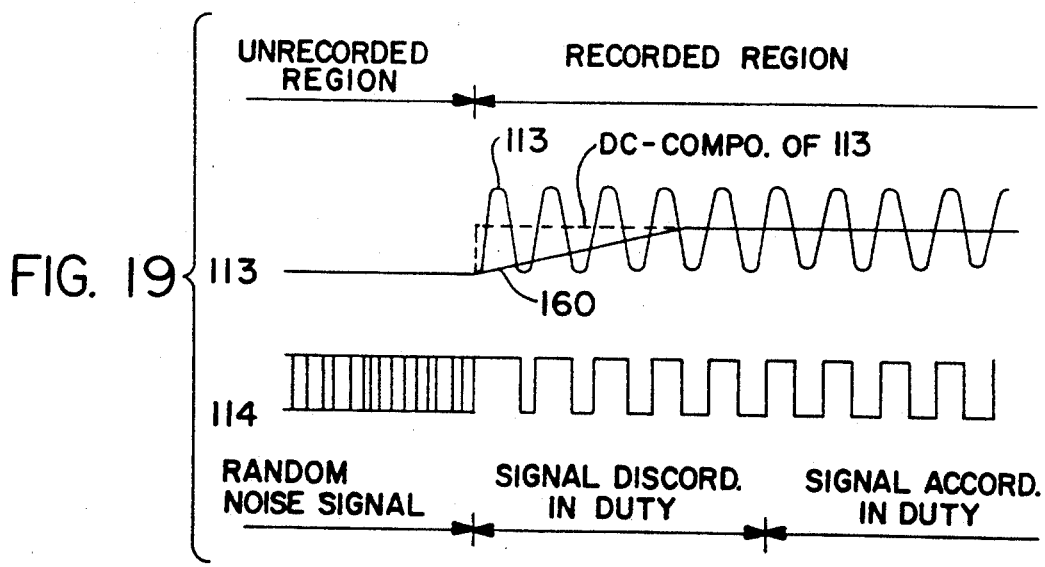
FIG. 19 is a schematic diagram showing the waveforms obtained in the signal detecting circuit of FIG. 18.

FIG. 19 shows the waveforms obtained in the signal detecting circuit 14 shown in FIG. 18. A signal corresponding to the recording mark can be obtained from the playback signal 113 only in the recorded region. DC-component of the playback signal 113 is shown by a dotted line in FIG. 19. However, the signal detecting circuit of this kind includes something of a disadvantage such that the output from the low pass filter 73 from the reference voltage generating circuit 72, i.e., the reference voltage 160 tends to present the waveform indicating the characteristics of the transient response relative to the DC-component of the playback signal 113. Accordingly, as shown in FIG. 19, the digital information signal 114 obtained through comparison between the playback signal 113 and the reference voltage 160 is caused to be a random noise signal in an unrecorded region and a signal discordant in duty immediately after the starting of the recorded region due to the transient characteristics of the reference voltage 160.

Figure 20:
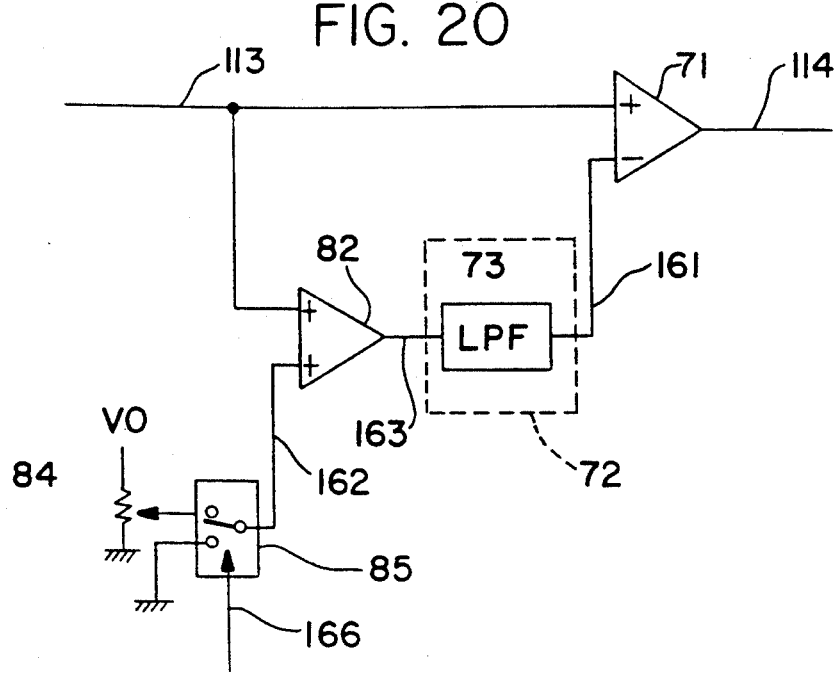
FIG. 20 is a diagram similar to FIG. 18, which particularly shows a modification thereof.

FIG. 20 is a second example of the signal detecting circuit 14, in which the playback signal 113 is inputted into the noninverting input terminal of the comparator 71 and into one input terminal of an adder 82. Either of a voltage divided from a constant-voltage vQ through a variable resistor 84 and the earthing voltage is selected through a switching circuit 85 in accordance with a timing signal 166 so that a signal 162 sent from the switching circuit 85 is applied to the other input terminal of the adder 82. The signal 162 is added to the playback signal 113 in the adder 82 and an output signal 163 produced thereby is fed into the reference voltage generating circuit 72. In this example, the low pass filter 73 is also employed as the reference voltage generating circuit 72, as in the first example shown in FIG. 18. A reference voltage 161 obtained through the reference voltage generating circuit 72 is introduced into an inverting input terminal of the comparator 71 so that the digital information signal 114 is outputted therefrom.

There is shown in FIG. 21, the waveforms obtained in the signal detecting circuit shown in FIG. 20. The signal 162 is added to the playback signal 113 in accordance with the timing signal 166. In other words, a signal in a certain level is added to the playback signal 113 only in the unrecorded region. Upon observation with respect to the DC-components of the signals, when the signal 162 is added to the DC-component of the playback signal 113 as shown in FIG. 21, the DC-component of the signal 163 shown by a dotted line can be obtained. Accordingly, the digital information signal 114 detected through comparison between the playback signal 113 and the reference voltage 161 outputted from the low pass filter 73 is capable of avoiding the random noise signal in the unrecorded region and can be improved in duty immediately after the starting of the recorded region. It is to be noted that although the signal 162 sent from the switching circuit 85 is added to the playback signal 113 in this example, only the random noise signal can be prevented from arising in the unrecorded region in the case where the signal 162 is added to the reference signal 161.

Figure 22:
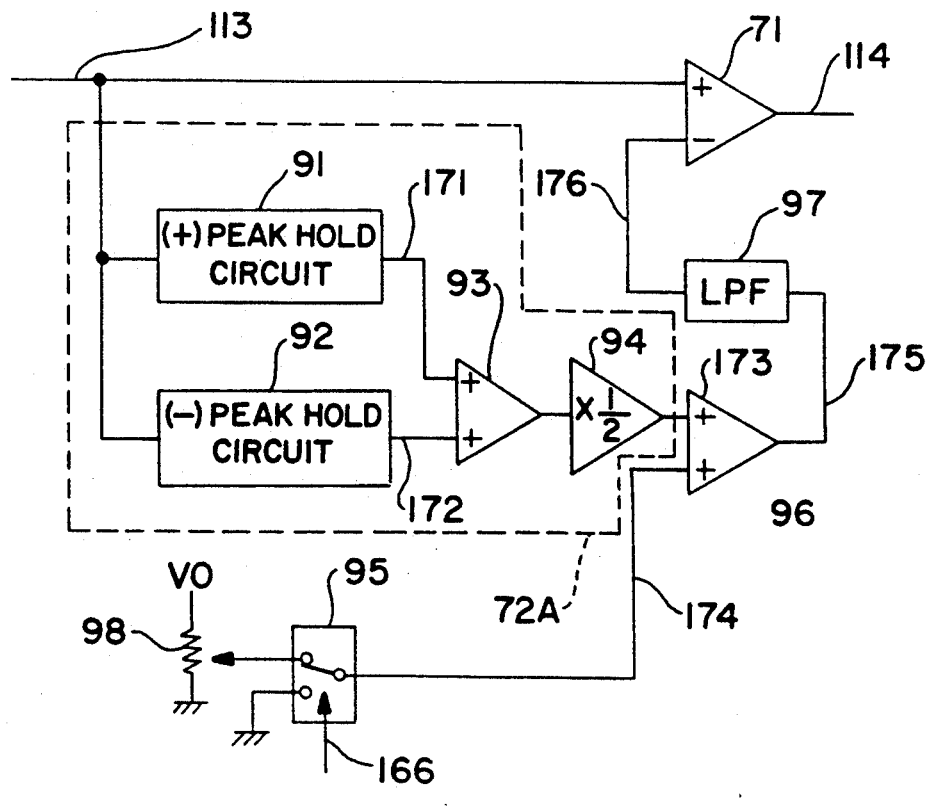
FIG. 22 is a diagram similar to FIG. 18, which particularly shows a further modification thereof.

Referring to FIG. 22, a third example of the signal detecting circuit 14 will be described below.

In FIG. 22, the playback signal 113 is led into the noninverting input terminal of the comparator 71 and into the reference voltage generating circuit 72A encircled by a dotted line, with the reference voltage generating circuit 72A being a different construction than that shown in FIG. 20. In the reference voltage generating circuit 72A, the playback signal 113 is introduced into both a positive peak hold circuit 91 and a negative peak hold circuit 92. An output 171 from the positive peak hold circuit is inputted into one input terminal of a first adder 93 and an output 172 from the negative peak hold circuit is inputted into the other input terminal thereof. Furthermore, an output from the first adder 93 is inputted, as an output 173 from the reference voltage generating circuit 72A, into one input terminal of a second adder 96 through a multiplier 94 which reduces the output from the first adder 93 by a half time. More specifically, the reference voltage generating circuit 72A of this kind is a second reference voltage generating circuit for detecting envelope lines of the playback signal 113 and for outputting the central level of the envelope lines as the second reference voltage. As in the second example shown in FIG. 20, a signal 174 is obtained upon selection of the voltage divided from the constant-voltage vO through a variable resistor 98 and ground in a switching circuit 95 in accordance with the timing signal 166. A signal 175 is outputted from the second adder 96 in which the aforementioned signal 174 is added to the output 173 from the reference voltage generating circuit 72A and subsequently, a first reference voltage 176 is obtained from the signal 175 through the low pass filter 97. Thereafter, the digital information signal 114 is detected upon comparison between the playback signal 113 and the first reference voltage 176 in the comparator 71.

There is illustrated in FIG. 23, the waveforms obtained in the signal detecting circuit shown in FIG. 22. The DC-component of the second reference voltage 173 is shown in comparison with the playback signal 113 in FIG. 23. The signal 174 from the switching circuit 95 is added to the second reference voltage 173 in accordance with the timing signal 166. Accordingly, the first reference voltage 176 is obtained with respect to the DC-component of the output signal 175 from the second adder 96 shown in FIG. 22, with the DC-component of the output signal 175 being indicated by a dotted line in FIG. 23. The digital information signal 114 can be obtained through comparison between the playback signal 113 and the first reference voltage 176. The digital information signal 114 in this example is also capable of avoiding the random noise signal in the unrecorded region and can be improved in duty immediately after the starting of the recorded region, as well as, in the second example described above. It is to be noted that although the signal 174 is added to the second reference voltage 173 in this example, the similar effect can be obtained in a manner that the signal 174 added not to the second reference voltage 173 but to the playback signal 113 and is inputted into the second reference voltage generating circuit 72A and the playback signal 113 is subsequently compared with the second reference voltage. Furthermore, even when the signal 174 is not added to the second reference voltage 173 but to the output signal from the low pass filter 97, only the random noise in the unrecorded region can be prevented from arising.

As described above, in the unrecorded region, by adding the voltage having a certain level to the playback signal or to the output from the second reference voltage generating circuit or to the reference voltage inputted into the comparator and by detecting the digital information signal with the use of the reference voltage obtained in this process, the random noise signal can be prevented from arising in the unrecorded region and the digital information signal can be improved in duty immediately after the starting of the recorded region. As a result, a drawing operation of the PLL in compliance with the digital information signal and the synchronization detection in the synchronization detecting circuit can be advantageously raised in reliability.

It is to be noted that the foregoing embodiments have been described with reference to the magnetic-optic disc memory device as the optical memory device, the present invention is not limited thereby, but is applicable to any of an optical disc memory of the additional storage type, an optical card or the like other than the magneto-optic disc memory device.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical memory device for applying an optical beam such as a laser beam onto a recording medium, said optical memory device comprising:
   reproducing means for detecting a laser beam reflected from the recording medium and for producing a playback signal from the laser beam reflected from the recording medium;
   a comparator for comparing said playback signal with a reference voltage;
   an adder for adding a voltage from a voltage source and having a certain level to said playback signal;
   a reference voltage generating circuit for generating said reference voltage on the basis of an output from said adder; and
   a signal detecting circuit including said comparator, said adder and said reference voltage generating circuit;
   said signal detecting circuit detecting a digital information signal from the comparison, carried out by said comparator, of said playback signal with said reference voltage.

2. The optical memory device as claimed in claim 1, further comprising:
   recording means for recording information onto the recording medium.

3. The optical memory device as claimed in claim 1, further comprising:
   erasing means for erasing information from the recording medium.

4. An optical memory device for applying an optical beam such as a laser beam onto a recording medium, said optical memory device comprising:
   reproducing means for detecting a laser beam reflected from the recording medium and for producing a playback signal from the laser beam reflected from the recording medium;
   a comparator for comparing said playback signal with a first reference voltage;
   a reference voltage generating circuit for generating a second reference voltage from said playback signal;
   an adder for adding a voltage from a voltage source and having a certain level to said second reference voltage; and
   a signal detecting circuit including said comparator, said reference voltage generating circuit and said adder;
   said signal detecting circuit detecting a digital information signal from the comparison, carried out by said comparator, of said playback signal with said first reference voltage, said first reference voltage being obtained from an output from said adder.

5. The optical memory device as claimed in claim 4, further comprising:
   recording means for recording information onto the recording medium.

6. The optical memory device as claimed in claim 4 further comprising:
   erasing means for erasing information from the recording medium.

* * * * *